United States Patent Office 3,109,130
Patented Oct. 29, 1963

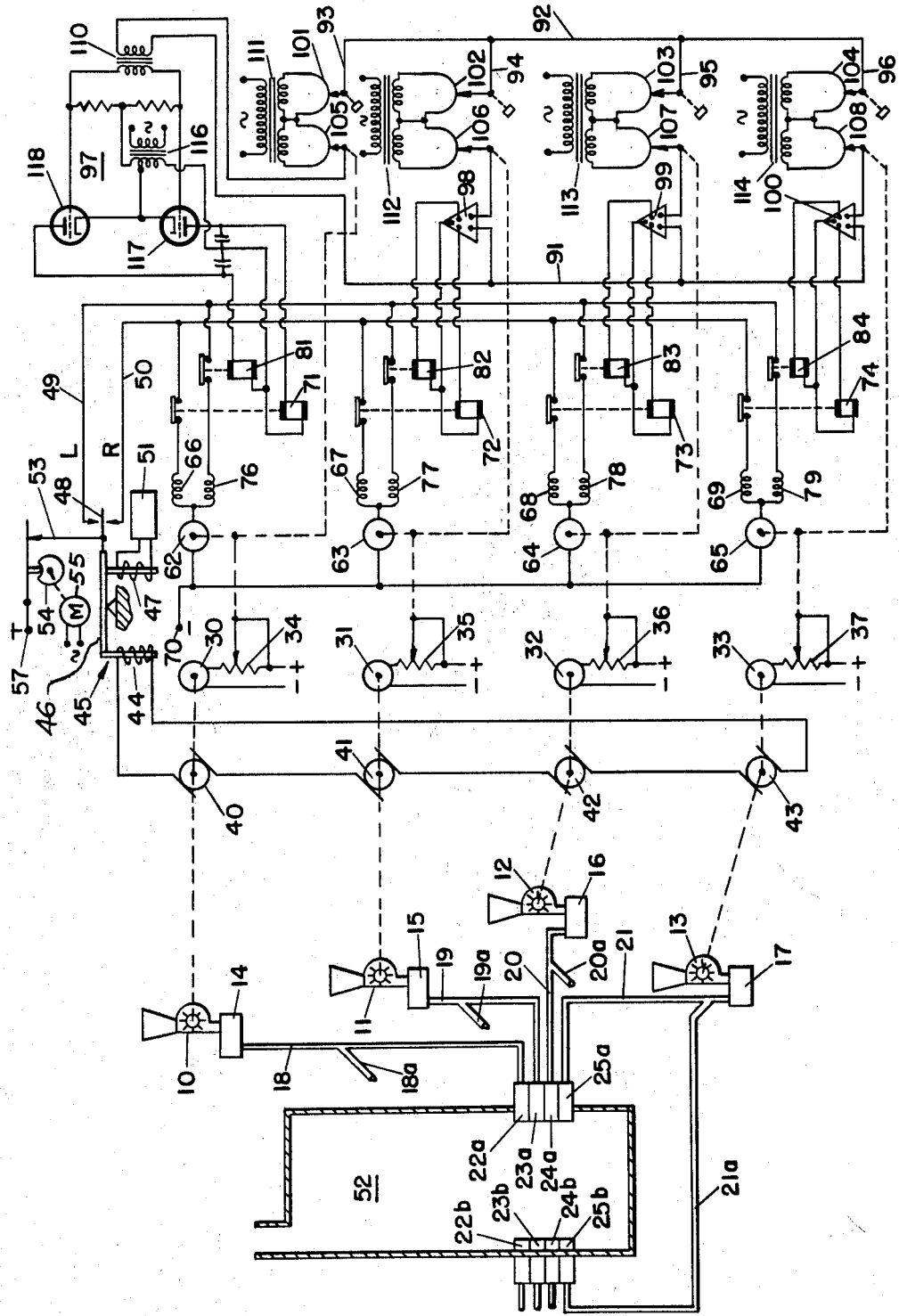

3,109,130
MULTIPLE MOTOR CONTROL SYSTEM
Theodore Cheng, Wynnewood, Warren D. MacNabb, Oreland, and Harold A. List, Ambler, Pa., assignors to Leeds and Northrup Company, Philadelphia, Pa., a corporation of Pennsylvania
Filed June 14, 1961, Ser. No. 117,109
5 Claims. (Cl. 318—72)

This invention relates to control systems of the type applicable to the control of a plurality of units which are arranged to cooperate one with another to produce a combined output to meet a load demand on the system and at the same time to maintain a predetermined sharing of that demand between individual units.

As explained in Bristol Patent 2,657,347, dated October 27, 1953, in a modern boiler or vapor generator a plurality of burners are utilized. The total needed fuel supply must be divided among the several burners in a manner not only to secure desired combustion conditions, but also to achieve a desired distribution of heat within the furnace. In some instances it may be desired to increase the rate of fuel supply to the upper set of the burners relative to the lower set of burners to increase the temperature of the combustion gases flowing through a superheater section, and in other cases it may be desired relatively to increase the rate of the fuel supply to the lower burners. In any case, it is necessary that the total fuel supplied to the combustion zone of the steam generator shall meet the demand on the generator, that demand in general being determined by the load upon associated turbine driven generators or alternators.

While the system of said Bristol patent provides one solution to the problem, something has been left to be desired in the achievement of the same end results in a different way. Thus, in the Bristol patent the control of the individual final control elements is required to follow one of the final control elements which serves as a master unit, and whenever an individual final control element gets out of step with the master, it is immediately forced back into step, i.e., made to maintain a predetermined relationship relative to the other final control elements. A control system of the foregoing type has sometimes been referred to as an active control circuit.

In accordance with the present invention, all final control elements are jointly under the control of a master controller, and the outputs rise and fall together so long as they are in step. When one final control element gets out of step by reason of a smaller or greater response than the others, the effect of the master controller on that final control element is discontinued in that direction until the remaining final control elements are again in step with it. This type of control has been referred to as permissive. To achieve permissive control, there is utilized a parallel permissive circuit equalization network, each branch of which includes a signal source proportional to the output of a final control element, a bias-producing means for developing an output voltage proportional to the desired relative output of the final control element relative to the outputs of the remaining final control elements, together with a detector. The latter is utilized to control the application of change-of-output signals from the master controller to the respective final control elements and to prevent change in output of a final control element in direction to increase the deviation of the output from a desired magnitude.

For further objects and advantages of the invention and for a more detailed discussion thereof, reference is to be had to the following description, taken in conjunction with the accompanying drawing.

Referring now to the drawing, the invention in one form has been shown as applied to a plurality of final control elements 10—13, each comprising feeding devices for supplying coal to pulverizing devices 14—17. These devices include a fan for transporting powdered or pulverized coal through lines 18—21 to a plurality of burners 22a—25a and their counterparts 22b—25b which receive pulverized coal from the same supply lines 18—21 as indicated by the branch lines 18a—21a, only the latter line 21a being shown connected to the lowermost burner 25b. It will be understood that the rate of supply of fuel to each burner will be dependent upon the speed of operation of the respective feeding devices 10—13. These devices are driven by electric motors 30—33, each motor having speed-adjusting means associated therewith and shown in the form of series resistors 34—37. The motors 30—33 respectively drive tachometer generators 40—43, the four of them being connected in a series circuit including a coil 44 of a balanceable master controller 45. The master controller 45 includes a centrally pivoted arm 46 which in response to the relative degrees of energization of coil 44 and a second coil 47 operates the movable blade of a single-pole double-throw switch 48 into and out of engagement with two stationary contacts. The upper contact is connected to a conductor 49 for application to actuating means for the final control elements of lowering signals, and the other lower contact being connected to a conductor 50 for application to the actuating means of "raise" signals.

The coil 47 located on the opposite side of the pivotal axis of the arm 46 from the coil 44 is energized by any suitable means 51 in response to the fuel requirements of the burners 22a—25a or 22b—25b. As shown, these burners are associated with a furnace 52 which may be a steam generator of any suitable type, such for example, as shown in said Bristol Patent 2,657,347. The condition-responsive device 51 may either apply to the pivoted arm 46 a mechanical force as shown in said Bristol patent, or that force may be that developed from the coil 47 and of magnitude dependent upon the extent of its energization. More particularly, the coil 47 may be energized by the voltage $E_8$ of FIGS. 1 and 1D of a Briston Patent 2,861,194. For the purpose of the present invention, the energization of the coil 47 will be proportional to the fuel demand of the furnace or boiler 52, and the energization of coil 44 will be proportional to the sum of the voltages developed by the tachometers 40—43.

If the fuel demand exceeds the rate of fuel delivery to the plurality of burners, the coil 47 will rotate pivoted arm 46 in a clockwise direction to close a circuit between the movable blade of switch 48 and the lowermost contact to complete a circuit by way of the conductor 50. With this circuit closed, there will then be periodically applied to the conductor 50 "raise" pulses developed by the periodic closure of a pulse-generating switch 53 which is opened and closed by means of a cam 54 driven by a motor 55. With the parts in the illustrated positions, but with the aforesaid circuit through switch 48 closed, it will be seen that current may flow by way of the positive terminal 57 of a suitable source of supply, switch contacts 53, the switch 48, and by way of conductor 50 to the actuating means for the final control elements 10—13. As shown, the means include the "raise" windings 66—69 of motors 62—65, each said motor having mechanical driving connections, as indicated by the broken lines, respectively extending to the adjustable contacts of the speed-varying devices 34—37. Each motor circuit is completed by way of the armature and thence to the negative terminal 70 of the source of supply.

It will be noted that each of the aforesaid motor circuits is completed by way of the contacts of relays 71—74. Had the demand for fuel been less than the rate of fuel supply, the force developed by the coil 44 would have exceeded that developed by the coil 47, and a lowering pulse would then be applied by way of conductor 49 to the respective motors 62—65 by way of the "lower" windings 76—79, these circuits again being completed respectively by way of the contacts of relays 81—84.

In the above description the concurrent energization of the motors 62—65 for rotation in one direction or the other takes place so long as each of the feeding devices or final control elements 10—13 is supplying its desired share of the load. For the moment, it may be assumed that the final control elements are equally to divide the load requirements. That division will be achieved unless one of motors 30—33 produces a speed of operation of one of the fedding devices 10—13 differing from the remaining feeding devices. This means that the final control elements 10—13 will not remain in step since one of them may tend to assume more or less than its share of the load.

To assure that there will be desired sharing of the load among the final control elements 10—13, the relays 71—74 and 81—84 have been provided in association with a relay control circuit of the parallel type including conductors 91 and 92 and provided with a plurality of branch circuits 93—96. The branch circuits respectively include identical phase-sensitive relay amplifiers 97—100, only one of which, the amplifier 97, has been shown in detail. Each of the branch circuits also includes biasing means shown as load-determining slidewires 101—104, and each branch circuit also includes one of the follow-up slidewires 105—108. The movable contacts of the slidewires 105—108 are respectively operated by the mechanical connections (shown by broken lines) to the respective motors 62—65. The slidewires of each branch circuit are energized from one-half of a center-tapped secondary winding of transformers 111—114. As shown, the movable contacts of the slidewires 101—104 have been illustrated in their mid-positions. Similarly, the follow-up contacts associated with slidewires 105—108 have been shown in their mid-positions. As a result, the net voltage in each branch circuit, as developed by the slidewires therein, is equal to the voltage similarly developed in each of the other branches.

The input circuit to the amplifier 97 extends between the movable contact of slidewire 105 and the conductor 91. This input voltage with the parts in the positions illustrated will be zero for the reason that instantaneous values of the voltage developed between the contacts of slidewires 101 and 105 in the first branch circuit 93 will be equal and opposite to the voltages developed in the remaining branch circuits. In the input circuit to amplifier 97 the net voltage will then be zero.

The foregoing condition of balance will be altered whenever the motor 62 adjusts the speed-varying means 34 of motor 30 by a finite amount differing from the adjustments made by the remaining motors 63—65 of their corresponding speed-varying means 35—37.

Assuming now that the motor 62 has effected a greater adjustment than the remaining motors and in direction to cause a greater amount of fuel to be delivered by the feeding device 10 than the remaining devices 11—13, then there will be applied to the primary winding of the input transformer 110 of amplifier 97 an input signal of phase which at the secondary winding of transformer 110 will, with respect to a phase-reference signal introduced by transformer 116, cause a tube 117 to conduct. In this manner, the operating coil of relay 71 will be energized to open its contacts and to interrupt application to the "raise" winding 66 of motor 62 of "raise" pulses. These "raise" pulses will continue to be applied to the "raise" windings 67—69 so long as the motors 63—65 move in unison or stay in step. Whenever one of them gets out of step in the above-assumed direction, then the corresponding one of relays 72—74 will be energized by its corresponding one of amplifiers 98—100 to interrupt flow of "raise" pulses thereto. It is in this manner that with "raise" pulses delivered to the conductor 50, the demand-adjusting devices including the motors 63—65 are brought back into step with the demand-adjusting device shown as motor 62.

Continuing with the foregoing assumptions, and particularly that the motor 62 is out of step, and now making the further assumption that the demand has changed from a requirement of "raise" pulses to one of "lower" pulses, it will be seen at once that the relay 81 has its contacts closed and, therefore, a lower pulse will be applied immediately to the lower winding 76 to reverse the direction of rotation of motor 62 and at the same time to readjust the contact of slidewire 105.

The lower pulses are not correspondingly applied to the windings 77—79 of motors 63—65 for the reason that in the above description the unbalance resulting in the input voltage to the input transformer 110 applies to each of the input circuits to amplifiers 98—100 input signals of opposite phase. Each amplifier thereupon energizes the operating coils of relays 82—84 to prevent application to motors 63—65 of the lowering pulses. In this manner, the control system quickly returns the motors 62—65 to their desired operation in maintaining predetermined division of the load requirements among the final control elements 10—13.

The foregoing operation of each of amplifiers 98—100 will be readily understood by assuming that the input signal to the transformer 110 of amplifier 97 is now of opposite phase to the input signal previously described. Such an input signal will cause the tube 118 to be conductive to energize the relay 81, the output circuit being readily traced from the secondary winding of the reference transformer 116 which is also the plate-supply transformer.

With the above understanding of the invention, it will now be seen that each of the knobs associated with the movable contacts of slidewires 101—104 may be operated to change the relative sharing of the load demand of the several final control elements 10—13. More particularly, it will be assumed that the movable contact of slidewire 101 is moved in a counterclockwise direction by a substantial amount. Such manual adjustment correspondingly increases the magnitude of the voltage introduced into the branch circuit 93 by the slidewire 101. Thus the net voltage introduced into branch circuit 93 then exceeds the voltage introduced into the branch circuit 94 by the slidewires 102 and 106.

Had the adjustment of the contact of slidewire 101 been in a clockwise direction from its illustrated position, it will be seen that the voltage introduced into the branch circuit 93 would have been made less than the voltage introduced by the slidewires 102 and 106 of branch circuit 94.

The foregoing explanation makes clear the fact that, considering branches 93 and 94 only, the instantaneous directions of current applied to amplifiers 97 and 98 will change in direction (phase) as the net voltage of branch 93 exceeds or is less than the voltage introduced into the branch circuit 94. Thus if the voltage of branch 93 is greater, the instantaneous current may be assumed to flow in a clockwise direction around a closed loop including branches 93 and 94. With the voltage of branch 93 less, the corresponding instantaneous current will then be in an opposite direction. Thus the current as applied to amplifiers 97 and 98 will in the two cases be of opposite direction, instantaneously considered and of opposite phase from the alternating current standpoint.

Returning again to the assumption that the contact of slidewire 101 occupies the position to the right of its illustrated position, it will then be seen that the unbalance voltage will have an instantaneous direction or phase such as to require the movable contact of slidewire 105 to be moved in a counterclockwise direction by motor 62 to restore equality between the branch voltages. This will result in energization of the relay 71 to prevent application to the motor 62 of "raise" pulses and to permit application thereto of lower pulses to move the contact of slidewire 105 in the required counterclockwise direction and simultaneously energize relay 82 for application of "raise" pulses only to the motor 63 to move the contact 106 in a clockwise direction until the voltage introduced in branch 93 again equals the voltage of branch 94. In this manner, there will be achieved a difference in the setting of the load-adjusting device 30 from that of the device 31 and the remaining devices 32 and 33. The motor 30 then operates at a lower speed than the motors or devices 31—33 driving the final control elements 11—13, and thus reduces the heat developed by the uppermost burners 22a, 22b relative to the lower burners.

It may be further noted that with the contact of slidewire 101 in its above-described position to the right of that shown in the drawing, a change in load demand as from the master controller 45 will result in equal changes in the delivery of fuel to the burners by the devices 10—13. However, the change in rate of delivery of fuel by the device 10 will be from a lower rate than will be the change which takes place at the remaining final control elements 11—13.

From the above description, it will be seen that the several final control elements 10—13 may, by means of the adjustment of the contacts associated with slidewires 101—104, be set for desired rates of flow of fuel to their associated burners and that these several final control elements will be adjusted equally to share in changes of load demand in either direction. However, for a given load, the final control elements 10—13 will share the load in predetermined division as established by the setting of the contacts of slidewires 101—104.

Though the invention has been described in terms of speed of rotation of motors 30—33 and of speed of rotation of the feeder devices comprising final control elements 10—13, it will be understood that the present invention may be utilized in connection with many different kinds of final control elements and, specifically, elements in which position changes the output or modifies the conditions under control. In combustion control, the positioning of throttling elements for oil or gas fuel provides full counterparts of the feeding devices 10—13 for the pulverized coal used for the above explanation. The tachometer summing circuit including the coil 44 suggests that other types of conventional summing circuits may be utilized with voltages developed therein by slidewires in response to position changes of the final control elements. The amplifiers themselves have been described as phase sensitive. However, the description has been in terms of both instantaneous polarities and phase. Accordingly, it will be seen that direct current amplifiers and direct current circuits may be utilized in accordance with the invention, the scope of which is to be determined by reference to the appended claims.

What is claimed is:

1. A control system for maintaining a desired relation between the outputs of a plurality of final control elements comprising master means responsive to the magnitude of a controlled variable for varying the outputs of said final control elements in directions to maintain said controlled variable at a desired value, output signal producing means for producing output signals representative of the individual outputs of said final control elements, biasing means for each of said final control elements for establishing reference levels representative of relative outputs therefrom, signal detecting means for each of said final control elements, a circuit having a plurality of parallel branches, one for each of said final control elements and each branch including in series circuit relation for one of said final control elements its said corresponding output signal producing means, biasing means and detecting means, said detecting means of each said branch having its circuit completed through the remaining of said branches for response to the average departure of all final control elements from their reference levels and to the departure of its final control element from its reference level and means intermediate said master means and said final control elements respectively responsive to said detecting means for modifying the action of said master means in varying the outputs of said final control elements whenever their said outputs depart from a predetermined relationship.

2. A control system for a plurality of final control elements comprising a control circuit having a plurality of parallel branches, one for each of said final control elements, each said branch including a signal producing means operable in accordance with change of output from a corresponding one of said final control elements, a biasing means, and a detecting means, each said detecting means responding to the difference between the potential difference across said control circuit and the net potential difference developed in its said branch thereof, actuating means for each of said final control elements, output signal producing means for each said final control element for producing an output signal representative of the output of each said final control element, a master controller having a summing means for application thereto of the sum of said output signals and having a second means for applying thereto an input representative of the sum of the outputs required of said final control elements, control circuits jointly operable under the control of said master controller for varying the outputs of said final control elements, and means operable under the control of said detectors for preventing change in one direction of the output of any control element which has been operated to produce an output differing in the same direction from the outputs of the remaining final control elements.

3. A control system for predetermining and maintaining the relative magnitudes of the outputs of a plurality of final control elements comprising a control circuit having a plurality of parallel branches, one for each of said final control elements, each said branch including output signal producing means for developing therein an output signal representative of the output of its associated final control element, a biasing means for establishing a bias signal representative of the output of its associated final control element relative to the outputs of the remaining final control elements, and a detecting means for its associated final control element, means including signal directing means for controlling the outputs of said final control elements, a master controller responsive to the difference in magnitude between the combined outputs of said final control elements and a signal representative of the sum of the outputs required of said final control elements for applying control signals to said directing means, and means operable in response to said detectors for operating said directing means for application of said control signals from said master controller to said final control elements for concurrently changing their outputs and for preventing application thereto of signals for changing the output of any final control element in a direction in which its output already differs from the outputs of the remaining final control elements.

4. A control system for maintaining a desired relation between the outputs of a plurality of final control elements comprising master means responsive to the magnitude of a controlled variable for varying the outputs of said final control elements in directions to maintain said controlled variable at a desired value, output signal producing means for producing output signals representative of the individual outputs of said final control elements, biasing means for each of said final control elements for establishing reference levels representative of relative outputs therefrom, signal detecting means for each of said final control elements, a circuit having a plurality of parallel branches, one for each of said final control elements and each branch including for one of said final control elements its said corresponding output signal producing means, its corresponding biasing means and its corresponding detecting means, said detecting means of each said branch having its circuit completed through the remaining of said branches for response to the average departure of all final control elements from their reference levels and to the departure of its final control element from its reference level and circuit-controlling means intermediate said master means and said final control elements responsive to said detecting means for preventing operation by said master means of one of said final control elements in one direction when the output of that final control element departs from a predetermined relationship with respect to the output of another of the remaining final control elements.

5. A control system for maintaining a desired relation between the outputs of a plurality of final control elements comprising master means responsive to the magnitude of a controlled variable for varying the outputs of said final control elements in directions to maintain said controlled variable at a desired value, output signal producing means for producing output signals representative of the individual outputs of said final control elements, biasing means for each of said final control elements for establishing reference levels representative of relative outputs therefrom, each of said biasing means being individually adjustable for establishing outputs for said final control elements which differ one from the other, signal detecting means for each of said final control elements, a circuit having a plurality of parallel branches, one for each of said final control elements and each branch including for one of said final control elements its said corresponding output signal producing means, its corresponding biasing means and its corresponding detecting means, said detecting means of each said branch having its circuit completed through the remaining of said branches for response to the average departure of all final control elements from their reference levels and to the departure of its final control element from its reference level and circuit-controlling means intermediate said master means and said final control elements responsive to said detecting means for preventing operation by said master means of one of said control elements in one direction when the output of that final control element departs from a predetermined relationship with respect to the outputs of the remaining final control elements.

References Cited in the file of this patent

UNITED STATES PATENTS

| 2,657,347 | Bristol | Oct. 27, 1953 |

FOREIGN PATENTS

| 534,039 | Canada | Dec. 4, 1946 |